United States Patent [19]

Schmidt

[11] 4,001,154

[45] Jan. 4, 1977

[54] PRIMER ADHESIVE COMPOSITION

[75] Inventor: Donald L. Schmidt, Midland, Mich.

[73] Assignee: The Dow Chemical Company, Midland, Mich.

[22] Filed: Sept. 4, 1973

[21] Appl. No.: 393,853

[52] U.S. Cl. .............. 260/29.4 UA; 260/29.6 TA; 260/29.6 H; 260/29.6 HN; 260/29.6 Z; 260/851; 260/856

[51] Int. Cl.² ........................................ C08L 61/20

[58] Field of Search .......... 260/29.4 UA, 826, 827, 260/856, 29.4 R, 851, 29.6 MQ, 29.7 SQ, 29.6 TA, 29.6 H, 29.6 HN, 29.6 Z; 117/126 GS, 126 GN

[56] References Cited

UNITED STATES PATENTS

| | | | |
|---|---|---|---|
| 2,956,907 | 10/1960 | Schmitz et al. | 260/29.4 UA |
| 3,116,192 | 12/1963 | Eilerman | 260/29.4 UA |
| 3,168,389 | 2/1965 | Eilerman | 117/126 GS |
| 3,177,170 | 4/1965 | Lund | 260/29.4 UA |
| 3,506,734 | 4/1970 | Bedikian | 260/29.4 UA |
| 3,677,810 | 7/1972 | Campbell et al. | 260/29.4 UA |
| 3,719,627 | 3/1973 | Parekh et al. | 260/29.4 UA |
| 3,862,079 | 1/1975 | Plueddemann | 260/29.7 SQ |

Primary Examiner—Lorenzo B. Hayes
Attorney, Agent, or Firm—L. Wayne White

[57] ABSTRACT

The adhesion of hydrophobic coatings to ferrous or siliceous articles is enhanced by first coating said articles with a primer comprising (a) a water-soluble cross-linkable polymer bearing a plurality of carboxyl groups, (b) a water-soluble cyclic sulfonium zwitterion or melamine cross-linking agent, and (c) a silane. The novel primers are thermally-curable film-forming compositions which are particularly useful in coating glass and ferrous articles.

14 Claims, No Drawings

PRIMER ADHESIVE COMPOSITION

BACKGROUND OF THE INVENTION

In many instances it is desirable to coat ferrous or siliceous articles with a protective and/or decorative coating. Such coatings are normally comprised of rigid, highly cross-linked, hydrophobic polymers and there is often poor adhesion between such polymeric coatings and the surface of the ferrous or siliceous articles. This is due, at least in part, to the fact that such surfaces tend to be hydrated and thus chemically dissimilar to the hydrophobic polymers.

Attempts to solve this problem have included physical and chemical modifications of the surfaces (e.g. pickling). Another approach has been to include various adhesion promoters into the coating formulation(s). Other attempts have involved application of primers or tie-coats to the surface of the article prior to application of the protective or decorative final coat. All of these means have worked to a greater or lesser extent but the problem still exists.

SUMMARY OF THE INVENTION

It has now been discovered that the adhesion of the aforementioned hydrophobic coatings to ferrous or siliceous articles is enhanced by first coating said articles with a novel primer composition comprising (a) a water-soluble cross-linkable polymer bearing a plurality of carboxyl groups, (b) a water-soluble aryl cyclic sulfonium zwitterion or melamine cross-linking agent, and (c) a silane. The novel primer compositions are thermally-curable film-forming compositions which are particularly useful in coating glass and ferrous articles.

The novel primer compositions are normally applied as an aqueous solution at a concentration level of from about 1 to about 5 weight percent, total weight basis. The article thus coated is subsequently dried at any convenient temperature to remove the water but it is advantageous to dry the coated article at a temperature sufficient to promote the cross-linking (curing) reaction between components (a) and (b). In this manner, the ferrous or siliceous articles are coated with a thin, water-swellable polymeric film which has excellent adhesion to both the coated substrate and to subsequent hydrophobic polymer coating of the type mentioned above.

Component (a) in the primer composition is a water-soluble cross-linkable polymer bearing a plurality of free carboxyl groups. Such carboxyl groups are the reactive sites in the cross-linking reaction. There are, of course, a wide variety of such polymers in this known class. They are generally substantially linear vinyl addition polymers having average molecular weights of from about 2,000 to about 500,000 which preferably contain a sufficient number of carboxyl groups to render the polymer water-soluble. Equally suitable, however, are those polymers which bear only a sufficient number of carboxyl groups as are needed for the cross-linking reaction and a sufficient amount of other hydrophilic groups as needed to render the polymers water-soluble.

Suitable such polymers include polyacrylic and polymethacrylic acid as well as copolymers of α-olefins such as ethylene or isobutylene with maleic acid, copolymers of vinyl aromatic hydrocarbons such as styrene, α-methyl styrene, vinyl toluene or the like with maleic anhydride or with acrylic or methacrylic acid, copolymers of acrylic or methacrylic acid with acrylamide, vinyl ketones, vinyl alkanoates or vinyl pyrrolidone and the like. Likewise, the carboxylic acid polymers may be terpolymers such as the terpolymers of acrylic acid and styrene and an alkyl acrylate and with various others of the foregoing monomers. Water-soluble alkali metal or ammonium salts of the acid-bearing polymers may also be utilized. The preferred polymers, however, are partially hydrolyzed polyacrylamides wherein from about 5 to about 30 percent of the amido moieties have been hydrolyzed to the free carboxyl group.

The anionic polymers can be prepared in conventional fashion by polymerization or copolymerization of the corresponding ethylenically unsaturated monomers, usually with the aid of a peroxide catalyst such as ammonium persulfate or tertiary butyl hydroperoxide. Alternately, anionic polymers may be prepared indirectly as, for example, by polymerizing acrylonitrile and hydrolyzing the resulting polyacrylonitrile with strong alkali such as sodium hydroxide. In the case of the olefin-maleate copolymers, it is generally desirable to copolymerize an α-olefin such as styrene with maleic anhydride and therefter to render the polymer water-soluble by opening the anhydride rings in known manners. Thus, direct hydrolysis of the anhydride ring yields the polymer in the acid form. Improved solubility in water is obtained by forming the ammonium salt from such an acid polymer. Alternately, the anhydride form of the polymer may be treated with ammonia to produce the water-soluble half amide-half ammonium salt form. In a further alternative, the anhydride form of such polymers may be reacted with an aliphatic hydroxyl compound to form a half ester which is subsequently reacted with a base to form the half ester-half salt. The partially hydrolyzed polyacrylamides are produced by hydrolyzing polyacrylamide by similar conventional techniques.

Component (b) is a water-soluble cross-linking agent which reacts with and through the carboxyl groups on (a). Component (b) therefore is selected from a known class of compounds which include melamine resins, hexamethoxymethylmelamine and resins thereof, aryl cyclic sulfonium zwitterions corresponding to Formula I or II below:

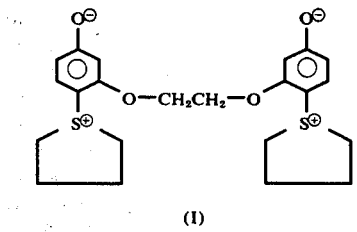

(I)

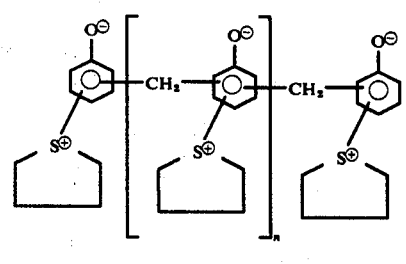

II wherein n is from 0 to 10, and the like.

Component (c) is a known class of silanes which corresponds to the formula $NH_2$―$(CH_2CH_2$―$NH)_q$―$CH_2CH_2CH_2$―$Si(OR)_3$ or N-alkylated derivatives thereof, wherein q is from 0 to about 10 (preferably 1) and R is hydrogen, methyl or ethyl. Examples of this class of compounds include $NH_2CH_2CH_2NH$―$(CH_2)_3Si(OCH_3)_3$, $NH_2$―$(CH_2)_3Si(OC_2H_5)_3$, $CH_3NH$―$(CH_2)_3Si(OCH_3)_3$, and $(CH_3)_2N$―$(CH_2)_3Si(OCH_3)_3$. Also satisfactory silanes are $HS$―$CH_2CH_2CH_2$―$Si(OR)_3$ and

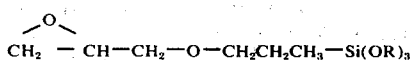

and the hydrolyzed derivatives thereof. The most preferred compounds are $NH_2$―$CH_2CH_2$―$NH$―$CH_2CH_2CH_2$―$Si(OR)$, wherein R is hydrogen or methyl.

The amounts of (a), (b) and (c) in the primer composition may be varied depending upon the particular components used. Normally, however, component (a) will be used in an amount of from about 40 to about 85 weight percent, component (b) will be used in an amount of from about 10 to about 45 weight percent, and component (c) will be used in amounts of from about 1 to about 35 weight percent. Preferred ranges are: component (a), from about 65 to about 80 weight percent; component (b), from about 15 to about 30 weight percent; and component (c), from about 1 to about 10 weight percent, total weight basis in each instance.

Other inert ingredients may be included in the primer compositions at the option of the user. E.g. bactericides, coloring agents, etc. may be included. Additionally, diluents, such as methanol or ethanol, may be advantageously included to increase the rate and/or degree of solvation of one or more of the components in the aqueous media.

The following examples will further illustrate the invention.

EXAMPLES 1-4

The following primer compositions were formulated and diluted to 3 weight percent, total weight basis, with water. The compositions were then applied to glass slides with a No. 11 Meyer rod and the coated slides dried in a forced air oven for 20 minutes at 80° C. An overcoat of the same aryl sulfonium zwitterion was applied as an aqueous solution thereof and similarly dried. The coated slides were then placed in boiling water for 4.5 hours, cooled, dried, and the coating cross-batched with a scribe. The adhesion was tested by the "Scotch-tape" test where a cellophane tape was firmly pressed against the coated side of the slide and then ripped away at a 180° angle. In every instance the adhesin was good—i.e. none of the coating was removed. The compositions are described in Table A.

Table A

| Ex. | Component, wt. percent | | |
|---|---|---|---|
| | (a) | (b) | (c) |
| 1 | 74.5 | 24.5 | 1 |
| 2 | 74.0 | 24.0 | 2 |
| 3 | 71.3 | 23.8 | 5 |
| 4 | 67.5 | 22.5 | 10 |

In each instance component (a) was a partially hydrolyzed polyacrylamide (7.19 percent hydrolysis) having an average apparent molecular weight of about 200,000; component (b) and the overcoat was a sulfonium zwitterion of Formula I above; and component (c) was $NH_2$―$CH_2CH_2$―$NH$―$CH_2CH_2CH_2$―$Si(OCH_3)_3$. In the primer formulation, component (c) probably hydrolyzed to the corresponding ―$Si(OH)_3$ compound. Other compositions containing these three components in other relative proportions were less satisfactory and compositions with only one or two of the three components present were failures (i.e. the coating peeled off in boiling water in 30 minutes or less).

EXAMPLE 5

Similar good adhesion results were observed when test solution number 3 above was applied to a mild-steel "Q panel" and subsequently dried, overcoated, etc. and tested as above. A control panel coated only with a sulfonium zwitterion failed the boiling water test in less then 30 minutes.

EXAMPLE 6

Similar good adhesion results were achieved when glass slides were treated as per Examples 1–4 but were overcoated with a sulfonium zwitterion of Formula II.

EXAMPLE 7

Another satisfactory primer composition was prepared by replacing the polyacrylamide of Examples 1–4 with a styrene (52 percent)/maleic anhydride (48 percent) interpolymer dissolved in ammonium hydride.

EXAMPLE 8

Similar good adhesion results were obtained when glass slides were treated as per Example 3 except that the sulfonium zwitterion in the primer was replaced with 20 weight percent of a novolac based zwitterion, Formula II, and the polyacrylamide was increased to 75 weight percent. Likewise, the sulfonium zwitterion topcoat was replaced with the novolac based zwitterion, Formula II. Good results were also achieved using the same primer and an acrylic topcoat (i.e. an interpolymer consisting of 20 percent hydroxypropyl acrylate, 25 percent butyl acrylate, 22 percent 2-ethylhexyl acrylate, 3 percent acrylic acid and 30 percent styrene.

EXAMPLE 9

In like manner, glass slides were primed with a dilute aqueous solution of 80 weight percent of the partially hydrolyzed polyacrylamide used above, 15 weight percent of a hexamethoxymethylmelamine (CYMEL 301 — sold by Cyanamid), and 5 weight percent of the silane descibed in Example 1. The coated slides were cured as above, coated with an aqueous solution of a novolac resin and cured again. Good adhesion results were observed even after 6 hours in boiling water.

EXAMPLES 10–12

Following the procedure in Example 8 except as hereafter noted, good adhesion results on glass slides were obtained by replacing the silane with

or a m- and p- mixture of CH$_2$=CH—C$_6$H$_4$—CH$_2$—NH—CH$_2$CH$_2$—NH—(CH$_2$)$_3$Si(OCH$_3$)$_3$.

Other primers as hereinbefore described can be similarly applied and used as well as other topcoats.

I claim:

1. A thermally-curable, film-forming, primer adhesive composition comprising an aqueous solution of
   a. a water-soluble, cross-linkable polymer bearing a plurality of carboxyl groups selected from the group consisting of a copolymer of an α-olefin with maleic acid; and copolyer of a vinyl aromatic hydrocarbon with maleic anhydride, acrylic or methacrylic acid; a copolymer of acrylic or methacrylic acid with acrylamide, a vinyl ketone, vinyl alkanoate or vinyl pyrrolidone; a terpolymer of acrylic acid and styrene and an alkyl acrylate; or a partially hydrolyzed polyacrylamide having from about 5 to about 30 percent of the acrylamide moieties in the form of free carboxyl groups; or a water-soluble alkali metal or ammoniumsalt thereof, and
   b. a small but sufficient amount of a water-soluble cross-linking agent to react with the carboxy groups in (a) and thereby form a water-swellable polymer, and
   c. a silane corresponding to the formula NH$_2$—(CH$_2$CH$_2$NH)$_q$CH$_2$CH$_2$CH$_2$—Si(OR)$_3$ or an N-alkylated derivative thereof or (HS—CH$_2$)$_3$Si(OR)$_3$ or

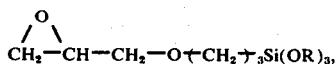

wherein q is 0 to 10 and R is hydrogen, methyl or ethyl.

2. The composition defined by claim 1 wherein (a) is a partially-hydrolyzed polyacrylamide having from about 5 to about 30 percent of the acrylamide moieties in the form of free carboxyl groups.

3. The composition defined by claim 1 wherein (b) is a melamine resin, or a sulfonium zwitterion corresponding to Formula I or II

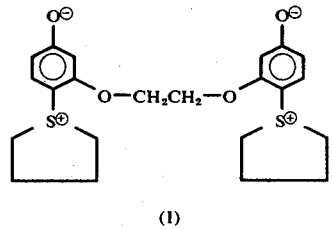

(I)

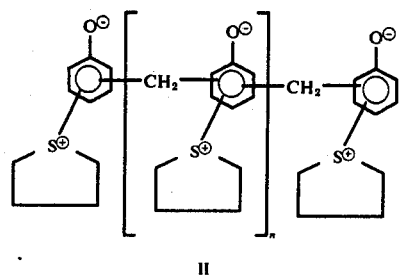

II where n is from 0 to 10.

4. The composition defined by claim 3 wherein q is 1.

5. The composition defined by claim wherein (c) is NH$_2$—CH$_2$CH$_2$—NH—CH$_2$CH$_2$CH$_2$—Si(OR)$_3$ wherein each R is H or methyl.

6. The composition defined by claim 5 wherein (a) is a partially hydrolyzed polyacrylamide having from about 5 to about 30 percent of the acrylamide moieties in the form of free carboxyl groups or a styrene-maleic anhydride interpolymer.

7. The composition defined by claim 6 wherein (b) is a hexamethoxymethylmelamine or a sulfonium zwitterion corresponding to I or II.

8. The composition defined by claim wherein (a) is a substantially linear vinyl addition polymer having an average molecular weight of from about 2,000 to about 500,000.

9. The composition defined by claim 1 wherein said α-olefin is ethylene or isobutylene, and said vinyl aromatic hydrocarbon is styrene, α-methylstyrene or vinyl toluene.

10. The composition defined by claim 1 wherein (a) is present in an amount of from about 40 to about 85 weight percent; (b) is present in an amount of from about 10 to about 45 weight percent; and (c) is present in an amount of from about 1 to about 35 weight percent.

11. The composition defined by claim 7 wherein (a) is present in an amount of from about 65 to about 80 weight percent; (b) is present in an amount of from about 15 to about 30 weight percent; and (c) is present in an amount of from about 1 to abut 10 weight percent.

12. The composition defined by claim 11 wherein (b) is hexamethoxymethylmelamine.

13. The composition defined by claim 11 wherein (b) is a sulfonium zwitterion corresponding to I.

14. The composition defined by claim 11 wherein (b) is a sulfonium zwitterion corresponding to II.

* * * * *

UNITED STATES PATENT AND TRADEMARK OFFICE
CERTIFICATE OF CORRECTION

PATENT NO. : 4,001,154
DATED : January 4, 1977
INVENTOR(S) : Donald L. Schmidt

Page 1 of 2

It is certified that error appears in the above-identified patent and that said Letters Patent are hereby corrected as shown below:

Title page, column 2, line 2: "260/29.4 UA" should read --260/826 UA--.

Column 2, line 24: "therefter" should read --thereafter--.

Column 3, line 58: "adhesin" should read --adhesion--.

Column 4, line 22: "then" should read --than--.

Column 5, line 12, Claim 1, line 6: "and copolyer" should read --a copolymer--.

Column 5, line 15, Claim 1, line 9: Between "ketone," and "vinyl" insert --a--.

Column 5, line 21, Claim 1, line 15: "ammoniumsalt" should read --ammonium salt--.

Column 5, line 28, Claim 1, line 22: "$(HS-CH_2)-$" should read -- $HS(CH_2)$ --.

Column 6, line 15, Claim 3, line 6: "where" should read --wherein--.

Column 6, line 17, Claim 5, line 1: Between "claim" and "wherein" insert --4--.

Column 6, line 28, Claim 8, line 1: Between "claim" and "wherein" insert --1--.

UNITED STATES PATENT OFFICE
CERTIFICATE OF CORRECTION

Patent No. 4,001,154  Dated January 4, 1977

Inventor(s) Donald L. Schmidt  Page 2 of 2

It is certified that error appears in the above-identified patent and that said Letters Patent are hereby corrected as shown below:

Column 6, line 46, Claim 11, line 5: "abut" should read -- about --.

Signed and Sealed this

Seventeenth Day of May 1977

[SEAL]

Attest:

RUTH C. MASON
Attesting Officer

C. MARSHALL DANN
Commissioner of Patents and Trademarks